UNITED STATES PATENT OFFICE.

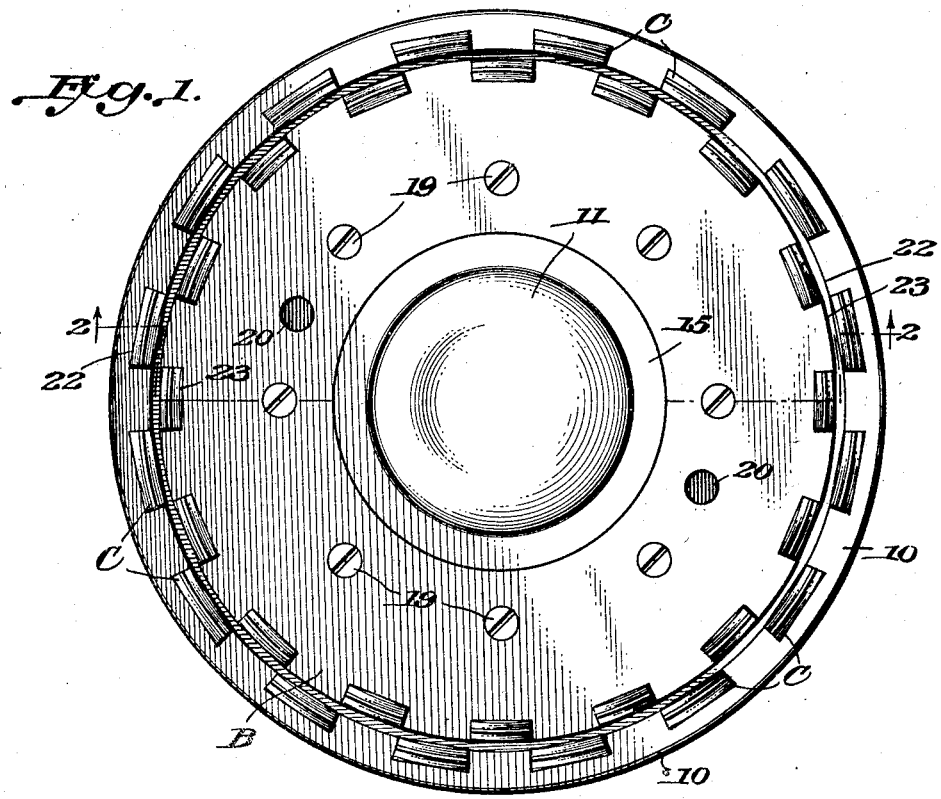
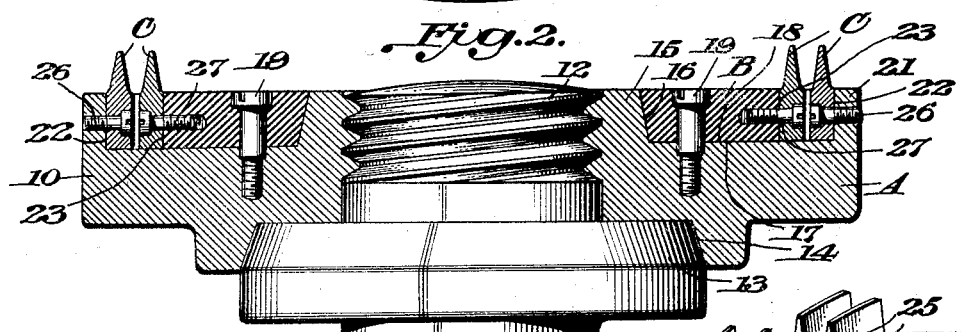
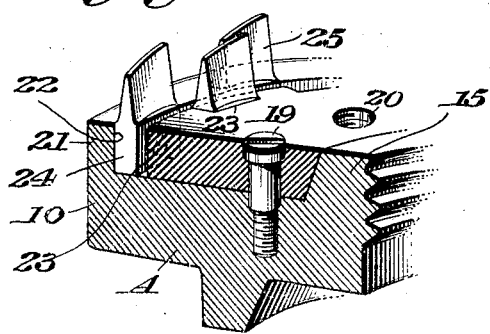
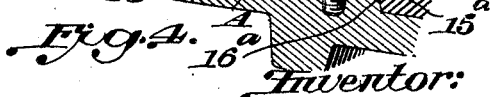

MILTON TIBBETTS, OF DETROIT, MICHIGAN, ASSIGNOR, BY MESNE ASSIGNMENTS, TO SECURITY TRUST COMPANY, OF DETROIT, MICHIGAN, A CORPORATION OF MICHIGAN.

GEAR CUTTER.

1,411,390. Specification of Letters Patent. Patented Apr. 4, 1922.

Application filed November 5, 1917. Serial No. 200,316.

*To all whom it may concern:*

Be it known that I, MILTON TIBBETTS, a citizen of the United States, and resident of Detroit, Wayne County, State of Michigan, have invented certain new and useful Improvements in Gear Cutters, of which the following is a specification.

This invention relates to gear cutters and particularly to cutters of the rotary type.

In the cutting of gears having curved teeth rotary cutters of the milling type have been used and heretofore the cutter blades have been secured to a one-piece head. In arranging the cutters on the head in two concentric series difficulties have arisen in connection with adjusting the separate sets or series of cutter blades on the head and in grinding the separate sets. The present invention contemplates providing a two-piece cutter head, one for each of two sets of cutter blades, and one of the objects of the invention therefore may be said to be to provide a gear cutter having two parts adapted to be detachably connected and to support a set of cutter blades on each of those parts.

Another object of the invention is to provide a cutter in which two sets of cutter blades are so mounted that one set may be ground, or sharpened while on its support independently of the other set of blades.

Other objects of the invention will appear from the following description taken in connection with the drawings which form a part of this specification, and in which:

Fig. 1 is a face view of a gear cutter embodying the invention;

Fig. 2 is a sectional view substantially on the line 2—2 of Fig. 1;

Fig. 3 is a perspective fragmentary view in perspective and in section showing the relative arrangement of cutter parts and cutter blades; and Fig. 4 is a view similar to Fig. 3 showing the cutter blades in different relative positions.

Referring to the drawings, 10 represents generally the head portion of the cutter forming the subject matter of this invention mounted upon a spindle 11 to which it is connected as by threading the spindle into the cutter head. The threading is shown at 12 and a ground conical surface 13 is shown as fitting into a similar recess 14 for the purpose of insuring the concentricity of the cutter head and spindle.

The cutter head 10 comprises the two parts A and B, the former being the part which is connected to the spindle 11 and having a central boss 15 which is adapted to fit a recess 16 formed in the part B. This boss and recess are preferably of conical shape and ground to a nice fit so that the concentricity of the parts A and B may be insured. It is desirable also that the plane face 17 of the part A and the similar plane face 18 of the part B shall be ground so that the two parts will fit well at all points where they touch.

The parts A and B are detachably connected together by a series of bolts 19 which fit somewhat loosely in the part B and two or more threaded holes 20 may be provided in the part B, as shown in Figs. 1, 3 and 4, for the purpose of inserting a tool to facilitate withdrawing the part B from the part A.

The part A is also formed with a peripheral flange 21, shown as extending radially outward from the boss 15 as well as radially outward from the periphery of the part B. By this arrangement of the parts the head 10 is provided with two adjacent concentric faces 22 and 23 respectively on the parts A and B.

Secured to the parts A and B at these faces are cutter blades C, each of which is formed as shown with a body portion 24 and a cutter portion 25. The cutter blades C are connected to the head in two sets or series, the outer set being countersunk into the inner face of the flange 21 and connected thereto as by bolts 26, and the inner set being countersunk into the periphery on face 23 of the part B and connected thereto as by bolts 27, and the two series of cutter blades are thus arranged in juxta-position or adjacent each other and concentric to the axis about which the head revolves.

In Figs. 1 and 3 the cutter blades are shown as arranged in staggered relation while in Fig. 4 each blade of the outer series is arranged radially to the corresponding blade of the inner series of cutter blades. Also in Fig. 4, the boss 15ª is formed on the part B instead of on the part A as in Figs. 2 and 3, and the recess 16ª is formed in the part A. This is a reversal of the arrangement shown in the other figures.

It will be understood that the part B may be disconnected from the part A and the cutter blades of each part may be separately ground and the parts may be again connected together. Their concentricity is insured by the boss and recess connection shown.

Other forms of the invention may be made without departing from its spirit or scope as defined in the appended claims.

Having thus described my invention, what I claim and desire to secure by Letters Patent is:—

1. A gear cutter comprising a head adapted for rotation with a spindle, said head having inner and outer detachable parts provided with adjacent concentric faces, and cutter blades connected to said parts at said faces.

2. A gear cutter comprising a head adapted for rotation with a spindle, said head having adjacent concentric faces disposed at different distances from the axis of rotation, and cutter blades connected to the head at said faces.

3. A gear cutter comprising a head adapted for rotation with a spindle, said head having adjacent concentric faces, and cutter blades connected to the head in two concentric series at said faces.

4. A gear cutter comprising a head adapted for rotation with a spindle, said head formed of two parts, each adapted to independently support a series of cutter blades, cutter blades separately mounted on each of said parts, and means for non-adjustably connecting said parts concentrically together.

5. A gear cutter comprising a head adapted for rotation with a spindle, said head formed of two parts, cutter blades mounted on each of said parts, the blades on one part being disposed a different distance from the axis of rotation than the blades on the other part, and means for connecting the parts together with the cutter blades of one part adjacent and in staggered relation to those of the other part.

6. A gear cutter comprising a rotary head formed in two parts, one of said parts having a concentric boss fitting in a concentric recess in the other part, and a series of cutter blades secured to each of said parts.

7. A gear cutter comprising a rotary head formed in two parts, one of said parts being formed with a center opening and adapted to be secured to a spindle, means for securing the other of said parts to the first part and concentrically with said spindle and separate cutter blades secured to both of said parts.

8. A gear cutter comprising a rotary head formed in two parts, one of said parts having a concentric tapered boss fitting in a concentric tapered recess in the other part, and separate cutter blades secured to both parts of the head.

9. A gear cutter comprising a rotary head formed in two parts, one of said parts having a central boss and a peripheral flange and the other of said parts being recessed and adapted to fit over said boss and inside of said flange, and two sets of cutter blades, one set secured to the inner side of said flange and the other to the periphery of said other part.

10. A gear cutter comprising a head adapted for rotation with a spindle, said head formed of two parts, each adapted to independently support a series of cutter blades, cutter blades separately mounted on each of said parts, means comprising non-threaded surfaces for concentrically positioning said parts relative to each other, and means for detachably securing said parts together.

In testimony whereof I affix my signature.

MILTON TIBBETTS.